United States Patent [19]

Hodgson

[11] Patent Number: 4,901,945
[45] Date of Patent: Feb. 20, 1990

[54] HYBRID WING ASSEMBLY

[76] Inventor: Frank L. Hodgson, 223 Hedge Rd., Menlo Park, Calif. 94025

[21] Appl. No.: 155,868

[22] Filed: Feb. 16, 1988

[51] Int. Cl.$^4$ .............................................. B64C 39/08
[52] U.S. Cl. ........................................ 244/2; 244/152; 244/45 R; 244/902
[58] Field of Search .............. 244/900, 901, 902, 12.1, 244/13, 2, 142, 145, 152, 139, 45 R

[56] References Cited

U.S. PATENT DOCUMENTS

| | | | |
|---|---|---|---|
| 3,995,799 | 12/1976 | Bartolini | 244/900 |
| 4,417,707 | 11/1983 | Leong | 244/900 |
| 4,424,945 | 1/1984 | Dell | 244/902 |
| 4,596,368 | 6/1986 | Schmittle | 244/13 |
| 4,601,443 | 7/1986 | Jones | 244/13 |
| 4,623,108 | 11/1986 | Musick | 244/13 |
| 4,634,080 | 1/1987 | McNally | 244/902 |

FOREIGN PATENT DOCUMENTS

| | | | |
|---|---|---|---|
| 749221 | 12/1966 | Canada | 244/12.1 |
| 750248 | 1/1967 | Canada | 244/12.1 |

Primary Examiner—Joseph F. Peters, Jr.
Assistant Examiner—Rodney Corl
Attorney, Agent, or Firm—Flehr, Hohbach, Test, Albritton & Herbert

[57] ABSTRACT

A hybrid wing assembly is made up of a load supporting center frame with laterally outwardly extending, articulated, wing sections. A parafoil is attached to the wing sections by flexible lines in flight, and rigid rods hold the parafoil in spaced relation to the wing at rest. Control lines extend from the parafoil to the user for controlling the assembly.

9 Claims, 4 Drawing Sheets

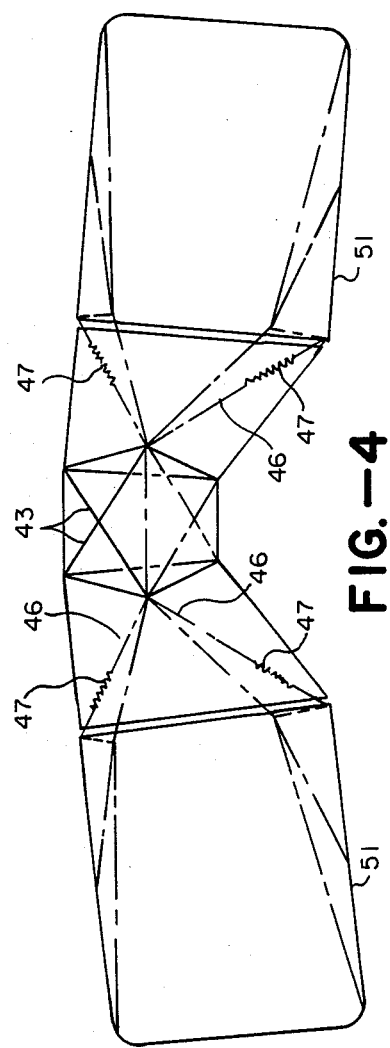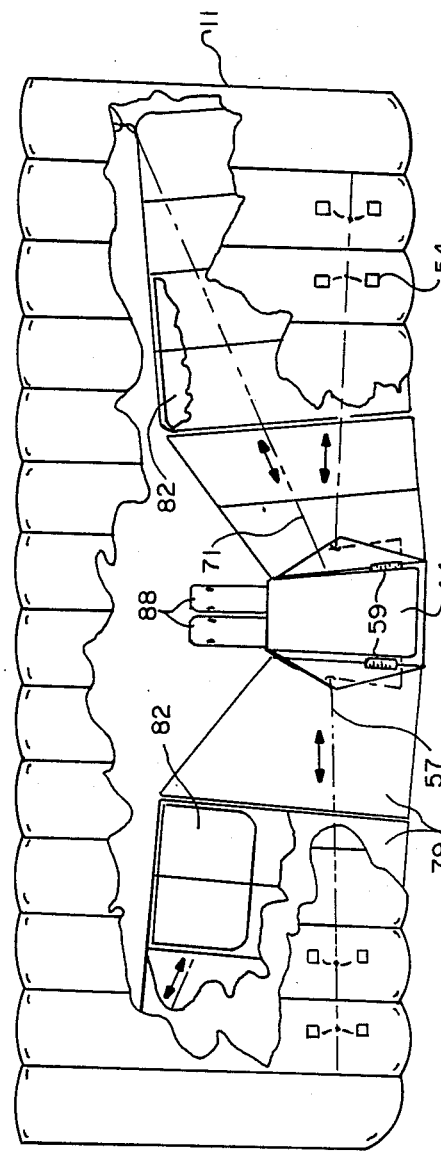

HYBRID WING ASSEMBLY

This invention relates generally to a controllable hybrid wing assembly and more particular to such an assembly for use as a sports or load carrying device. The assembly comprises the combination of a wing suspended from a parasail. The assembly may be used in either of two modes: one mode being used as a towed unit by a towing means such as a power boat, snow mobile or the like; and the other mode being used in free flight as a hang glider.

Existing types of towed units include gliders, kites, parachutes, parasails, parafoils and hang gliders. Such units are not designed to operate at low altitudes directly over a surface with an almost horizontal tow line. In such situations they tend to function in an unstable manner whereby they either abruptly land or abruptly loft to a high tow line angle such as is normally associated with ordinary kites, forty degrees being a common elevational angle. When towed these devices tend to permit very little control over elevation or over lateral movements. They are usually very dependent on the speed of the towing vehicle and upon local wind conditions. These devices all have an inherent hazardous propensity to stall in high winds or in excessive lift situations. They tend to enter into stable stalls to the side, a condition called "lockout". In addition these devices, being normally used for purposes other than flight close to surface, are largely devoid of attachments which would permit the routine landing on or launched from water or a solid surface.

A waterproof floating glider has been constructed and tested. It has excessive weight, a regular cockpit for the pilot and long efficient tapered wings, all of which make stable low level flight and quick low level turns impractical.

None of the existing devices work well at a low tow line angle. For these devices crosswinds, tailwinds and sudden wind gusts are particularly troublesome and dangerous.

Apart from gliders the control methods used for the prior art devices are relatively crude. Kites are particularly difficult to control with a low angle tow line. Parasails, parafoils, parachutes and hang gliders suffer from additional control problems arising from the pendulum-like relationship between the rider, or user, and the lifting surface which swings the user out and away from the lifting surface when turning. This type of control is indirect control, unsuitable for quick dynamic turns directly over water or terrain. For towed hang gliders the problem is particularly acute as the main means for turning is by the rider shifting his weight which is rather ineffective when the unit is towed.

In summary, all of the towed devices of the prior art largely relegate the user to the status of a passenger having little or no control over the unit.

It is a general object of the present invention to provide an improved controllable winged assembly.

It is another object of the present invention to provide an effective unit capable of realizing smooth transition from water or from terrain for controlled low level flights and for landing on such surfaces.

It is another object of the present invention to provide a hybrid wing including a parasail and a wing which permits the user to directly control the wing by the position of the upper legs, by manual means, by weight shifting, and by utilizing control surfaces attached to his legs or feet.

It is another object of the present invention to provide a hybrid wing which has excellent control over elevation and lateral movement of the wing particularly at low tow line angles.

It is a further object of the present invention to provide a hybrid wing assembly which can be used as a hang glider with the parafoil rigged close to the wing frame whereby to permit the user to exercise efficient control over the parafoil.

The foregoing and other objects of the invention are achieved by a hybrid wing assembly which includes an elongated wing which includes sections extending laterally outwardly from a load supporting center and a parafoil rigged above the elongated wing whereby when the hybrid wing assembly is in flight the parafoil is spaced above and supports the wing and associated load.

The foregoing and other objects will be more clearly understood from the following description taken in connection with the accompanying drawings of which:

FIG. 4 is a bottom view of the hybrid wing shown in FIG. 3.

FIG. 5 is a top plan view of the hybrid wing shown in FIG. 1 with the parasail portion partially broken away to show the center support section ±or the wing, and with the fabric on one wing broken away to show the frame, and controls.

Figure 1:
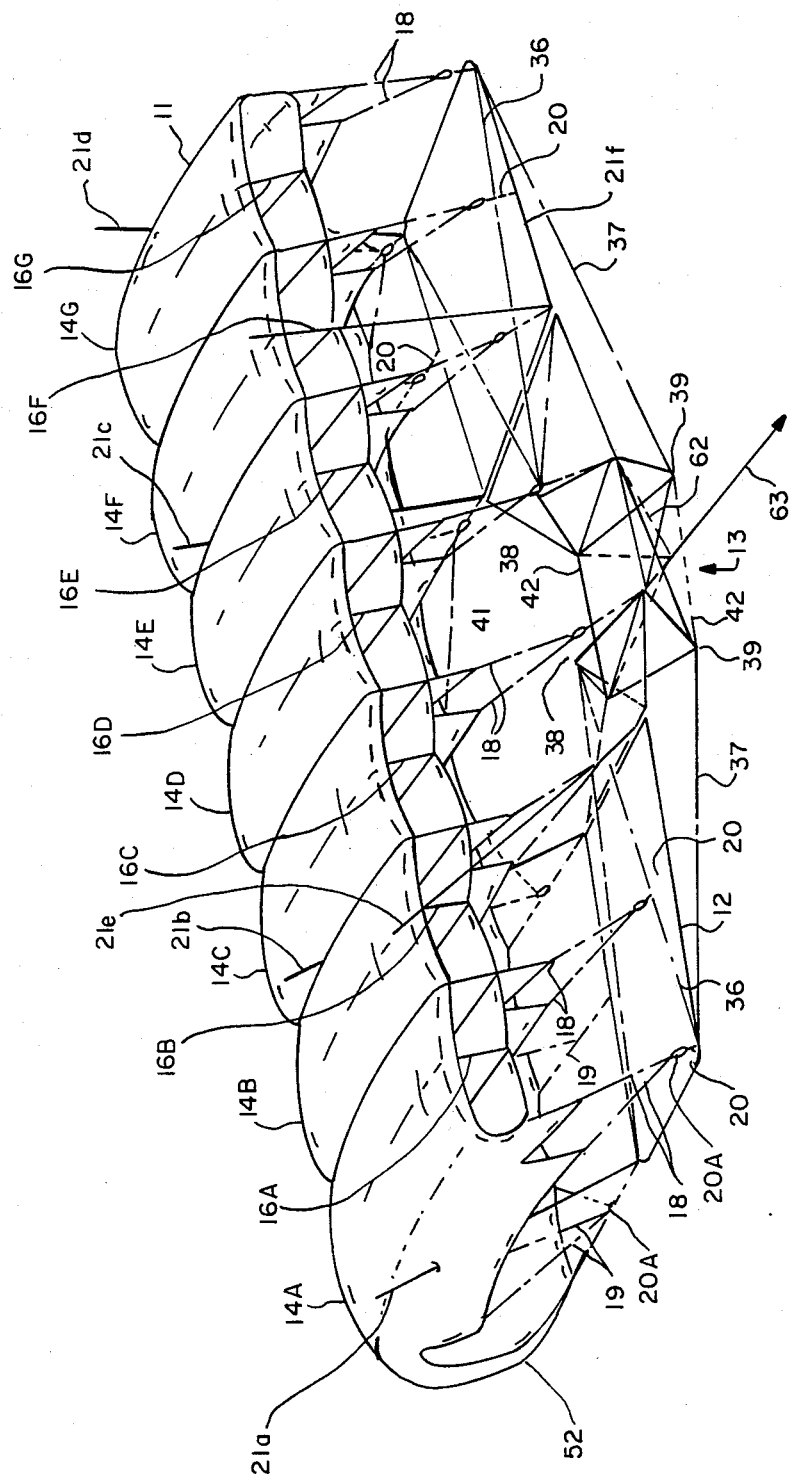
FIG. 1 is a perspective view of a hybrid wing assembly in accordance with the preferred embodiment of the present invention.

Referring particularly to the figures wherein like-referenced numbers have been applied to like-parts throughout the description, FIG. 1 shows a parasail 11 above and supporting a wing 12. The wing includes a load supporting center section 13. The parasail includes seven cells 14A–14G each subdivided by a wall 16A–16G respectively. It is understood that parasails having more or less cells can be used.

A typical parasail would have a surface area approximately 250 square feet with a span substantially equal to the span of the wing 12. This insures that the lines 18, 19 which attach the boundaries of the cells with the front and rear edges of the wing extend substantially vertically upwards and backwards during flight.

The parasail is preferably waterproof and is attached to the wing by lines 20 including releasable snaps 20A. The rear of the parasail is supported above the water or terrain when the canopy is not inflated by rods 21a–21d extending upward from the rear edge of the wing through and supporting the canopy as shown in FIG. 1.

The rear support rods 21a–21d thereby maintain the rear of the parasail above the water or terrain and the front rods 21e, 21f allow routine inflation when starting.

When starting in water, flotation members 82, 94 may be attached to the underside of the wing. The rear flotation members 82 being large to provide support for the canopy. The resulting angle of attack is about 18 degrees when floating, which increases to about 35 degrees in flight.

Figure 2:
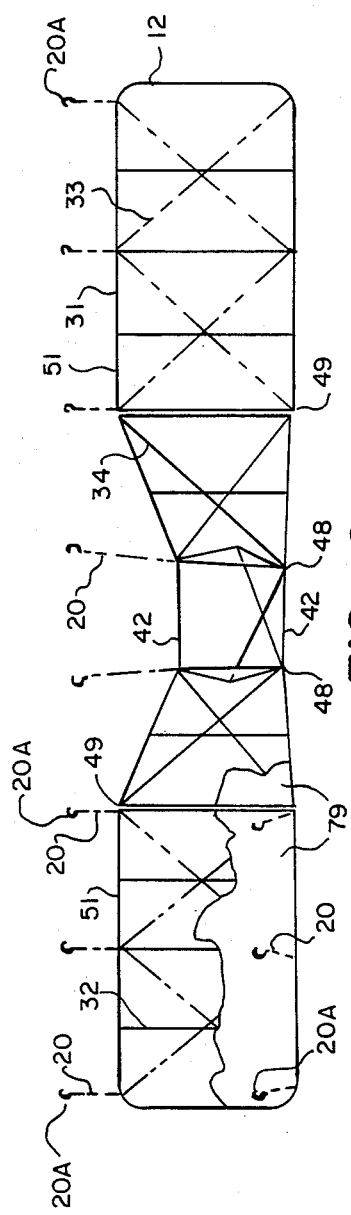
FIG. 2 is a top plan view of the hybrid wing partly broken away to show the frame.
Figure 3:
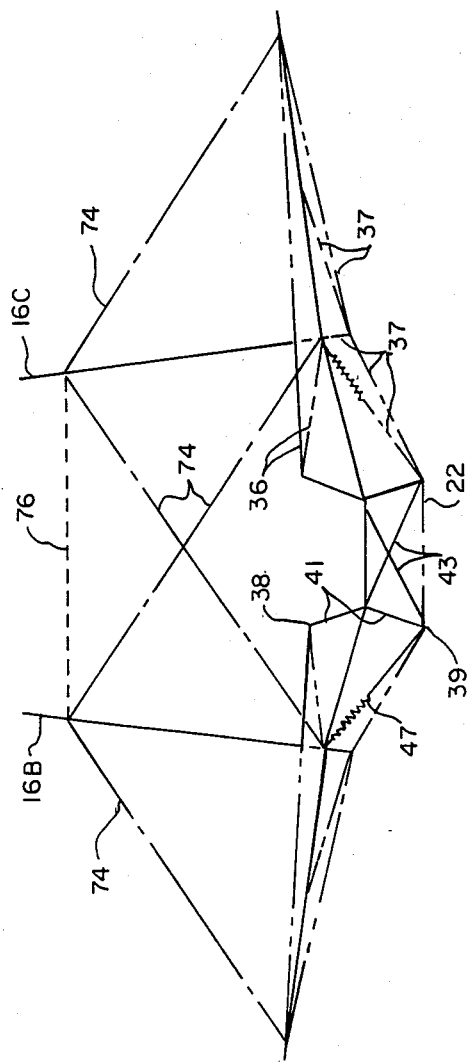
FIG. 3 is a skeleton front view of the hybrid wing assembly showing the wing support.

The wing 12 may be formed in any conventional manner, however, in accordance with the present invention, the wing comprises a frame having peripheral or edge member 31, FIG. 2, forming the outline of the wing and which may comprise a tubular or other light metal member. Crossed members 32, 34 and stabilizing cables 33 between the ends of alternate members provide rigidity to the frame.

The wing is supported in its elevated position by means of upper cables 36, FIG. 4, and lower cables 37 which extend from points 38 and 39 of the central frame assembly. The lateral lines 74 and elastic cord 76 attach to the rear center rods 16B and 16C and stabilize the wings thereby avoid a condition called dutch roll instability.

The central frame assembly includes upper and lower triangular frames 41 defining the upper and lower support points 38, 39 for the cables. Spacing members 42 and reinforcing members 43 form a rigid frame assembly. A platform may rest in the frame to receive a mattress 44, FIGS. 5 and 6, or other support whereby a user may lay on the soft surface of the mattress 44 with his feet extending to the rear. When operating the hybrid wing as a towed vehicle the wing frame is provided with a cloth or other surface membrane 79. When operating as a hang glider the surface membrane 79 may or may not be included depending upon the operator.

The preferred embodiment of the invention utilizes cables 46 with springs 47 which allow the wings to flex and pivot in response to variations in wing loading while in flight. The flexing reduces the lift by shortening the effective span of the canopy and wing and by distorting the canopy from its normal level configuration. The use of flexing wings gives superior results over the use of stiff ones. One reason is that the rear edge of the wing can be adjusted to be roughly parallel to the water which increases the ground effect thereby making the assembly more stable when just skimming over a surface. The flexing wing also cushions any incidental contact with the water or terrain. Such contact is far more abrupt with stiff wings. The preferred embodiment of the invention uses a wing having seven sections with the wing flexing at the joints 48 with the center section and at the spars 49 two sections away from the center section. The dihedral angles of these wing sections can be 7 to 18 degrees, with typical values being 14 degrees for the inner section and 11 degrees for the outer section. The center section and wings have an angle of attack which varies 15–40 degrees, 18 degrees being typical when floating and 35 degrees being typical when in flight. This flight angle of attack is not greatly affected by the position of the user.

For convenience the wing can have a sweep angle, FIG. 4, to give the user better visibility. The sweep angle also contributes to the stability of the wing. The use of a substantial dihedral angle together with a short wing span permits the unit to make turns at low elevations, close to the water or terrain. The surface of the wings extends back to either side of the user so that the rear or trailing edge 51 is partially immersed in the water when starting. The spar of the wings is roughly equal to the span of the parafoil being used, 17-22 feet, a typical value being 20 feet.

The parafoil used is typically 12 feet from front to rear. The angle of attack of the canopy being 12-19 degrees, 15 degrees being typical. The rear edge or brakes 52 are fully down to give both drag and lift. The setting for the brakes is an adjustable option for the user.

The lines 18, 19 for the parafoil are attached to the front and rear of the wing frame by lines 20. The parafoil generates virtually all the needed lift while the wings provide stability to the assembly. The stability is due to the high angle of attack, the large dihedral angle and to whatever drag forces the wing and canopy generate. As the device is towed by a power boat or snow mobile, the efficiency of the hybrid wing assembly is not of much concern. Indeed an inefficient wing having high drag gives better stability. Generally the lift and drag characteristics of the wing are only incidentally related to performance. When the device is close to the surface, the wing acts in response to phenomenon called "ground effect" by compressing the trapped air between the wing and the surface to give a cushioned buffer. The user can utilize this effect by adjusting the lift to just skim over the surface in a very stable manner, somewhat like a pelican.

Control of the flight of the hybrid wing is by control of the parasail or canopy 11. One method of control involves the control lines 53, FIGS. 5 and 6, which are attached to the top membrane of the parasail such as at 54 and which pass downwardly through the bottom membrane of the canopy to a point 56 on the line 57 which extends from the wing over a member 58 and to a handle 59 which is controlled by the user. Movement of the handle tends to pull the lines to control the upper surface of the parafoil to control filling of the parafoil. Dimpling of the parafoil reduces the lift at the end of the parafoil, thus, by controlling the lines on the left and right side of the parafoil it is possible to control the flight of the hybrid wing assembly. Weight shifting by the user to either side also gives a substantial measure of control.

It is possible to control the flight by controlling the passage of air from under the canopy directly through the canopy between adjacent cell boundaries.

Although not shown, it is also possible to control the flight by controlling ailerons on the wing surface or by varying the angle of attack of the wing. For a unit which permits variation in the angle of attack of all or of a substantial portion of each wing, the resulting method of control must be labeled as hazardous for all but the most experienced users.

Figure 6:
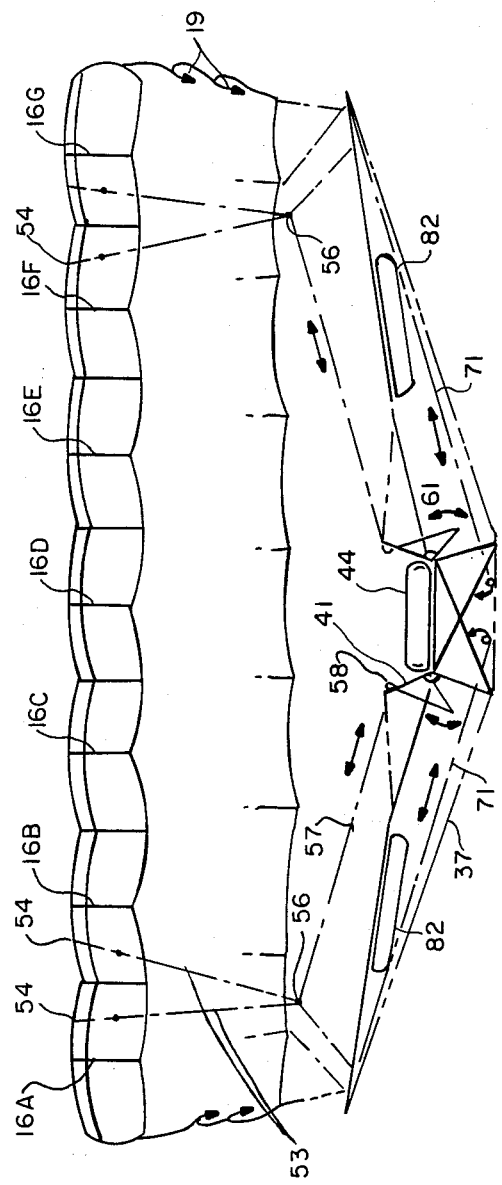
FIG. 6 is a front elevational view of the hybrid wing assembly of FIG. 5.
Figure 7:
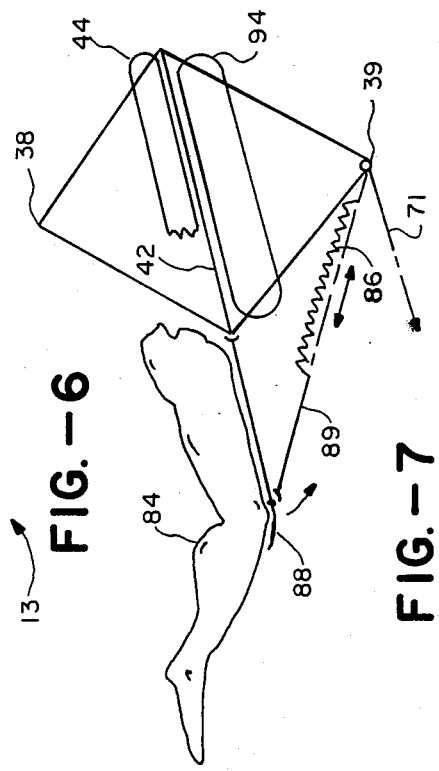
FIG. 7 is a schematic side view of the center section of the hybrid wing assembly showing the knee controls.

The preferred method for control as shown in FIGS. 6 and 7 is by the bending motion of the user's legs 84 to depress either or both knee rests 88. This shortens the supporting member 89 and compresses a restoring spring 86. The resulting motion is communicated by a control line 71 under the wing and upward to the outer rear corner lines 19 of the parasail. Thus, by controlling the lines on the left and right side cf the parasail by spilling air from under the rear corners, it is possible to control the hybrid wing assembly.

As previously described, the user or rider is centrally situated in a prone face-down position over the central frame assembly 13 to which the user may be attached or to which the user may cling. The center section in which the user rests is open in the front and extends back to the top or middle of the femurs of the user. The user rests directly on an air mattress 44 or other soft surface. It is also possible for the user to kneel on the center section once the canopy is inflated and the unit is close to lift off speed. The control handles may be on the leading edge of the center section or to the sides of it at the option of the user.

Typical flight speed at lift off for a unit having a gross weight of 280 pounds, is about 16 mph. As a sports device, the unit has the advantage of slow starts, low flight speeds and flight control that requires little or no skill. Turns which do not utilize ground effect however are substantially more difficult and require a fair amount of skill and good coordination with the operator towing the wing assembly as in such case good piloting skills are needed.

The user can wear large lightweight fins which have the appearance of large swim fins. These give additional aerodynamic control when in flight and help stabilize the device when in contact with the water. The angle of attack of the frame is determined by the webbing 62 to which the tow line 63 is attached and does not change unless the unit is specifically designed for drastic maneuvers. The webbing 62 attaches to the four corners of the center section of the frame assembly 13. The tow line may be releasably attached to the towing vehicle whereby the user may release the hybrid wing assembly for free flight.

It is seen that there has been provided a hybrid wing assembly which provides stable flight and can easily be controlled by a user preferably through the manipulation and control of the parafoil surfaces.

I claim:

1. A hybrid wing assembly comprising a load supporting center frame assembly, an elongated fabric covered wing frame which extends laterally outwardly in opposite directions from the load supporting center frame assembly, said wing frame comprising a plurality of lateral sections extending outwardly and articulated with respect to one another to form a flexible wing, a parafoil, said wing frame extending substantially the width of said parafoil, flexible lines for attaching the parafoil to the wing frame whereby when the hybrid wing assembly is in flight the parafoil is spaced above and supports the wing frame and load supporting center frame assembly, and a plurality of rods which extend upwardly from the edges of the wing frame and engage the parafoil to support the parafoil in operating position above the wing when the hybrid wing assembly is at rest.

2. A hybrid assembly as in claim 1 in which cables extend outwardly from said load supporting center frame assembly to support the outer wing sections.

3. A hybrid wing assembly as in claim 2 including supporting lines extended between the load supporting center frame assembly, selected parafoil support rods and the wing frame to stabilize the wings.

4. A hybrid wing assembly as in claim 1 wherein said flexible lines are detachably secured to permit separation of said wing and parafoil.

5. A hybrid wing assembly as in claim 1 wherein said articulated wing sections include means permitting the wing sections to be folded upward to permit compact transport of the entire unit.

6. A hybrid wing assembly as in claim 1 wherein said parafoil is waterproof and flotation means are attached to said wing frame to support said wing frame on water.

7. A hybrid wing assembly as in claim 1 including control lines which extend from the load supporting frame assembly and have one end connected to the outer rear corner of the parafoil, means connected at the other end of said control line adapted to engage the leg of a user whereby the forward and downward motion of either leg of the user controls the respective outer rear corner of said parafoil on each side.

8. A hybrid wing assembly as in claim 7 including additional control lines, one end of said additional control lines connected to the upper surface of the parafoil, said additional control lines extending to said load supporting center frame assembly and having the other end attached to a control means whereby a user can control filling of the parafoil.

9. A hybrid wing assembly as in claim 1 including control lines which extend from the load supporting frame assembly and have an end connected to the outer rear corner of the parafoil, said other end permitting a user to control the respective outer rear corner of said parafoil on each side.

* * * * *